United States Patent [19]

Ingraham

[11] Patent Number: 4,914,346
[45] Date of Patent: Apr. 3, 1990

[54] LAMP ENVELOPE HAVING A LUMINESCENT MATERIAL ON THE INTERIOR SURFACE THEREOF, METHOD OF APPLYING SAID MATERIAL, AND MATERIAL TO BE APPLIED

[75] Inventor: Robert C. Ingraham, Bedford, N.H.

[73] Assignee: GTE Products Corporation, Danves, Mass.

[21] Appl. No.: 132,726

[22] Filed: Dec. 11, 1987

Related U.S. Application Data

[60] Continuation of Ser. No. 655,115, Sep. 27, 1984, abandoned, which is a division of Ser. No. 472,399, Mar. 4, 1983, abandoned.

[51] Int. Cl.⁴ .................. H01J 61/42; H01J 61/46
[52] U.S. Cl. ............................ 313/485; 313/635; 427/64
[58] Field of Search .............. 313/485, 635; 427/64, 427/67, 71, 106, 157

[56] References Cited

U.S. PATENT DOCUMENTS 3,602,757  8/1971  Wachtel .................... 313/485 X
3,679,452  7/1972  Ropp ........................ 313/485 X
3,825,792  7/1974  Rokosz et al. ............. 313/487

FOREIGN PATENT DOCUMENTS 57-124829(A)  8/1982  Japan.

Primary Examiner—Kenneth Wieder
Attorney, Agent, or Firm—William H. McNeill; Martha Ann Finnegan

[57] ABSTRACT

Heavy weights of luminescent material; e.g., from 0.0087 to 0.010 g/cm², can be applied and adhered to the interior surface of lamp envelopes by mixing with the material up to 20% by weight boric acid. The material and boric acid are applied by electrostatic deposition and the envelope containing the material is then heated to a temperature of at least 300° C. to convert the boric acid to boron anhydride. The envelope is subsequently cooled and employed with a light source capsule to form a lamp.

2 Claims, 1 Drawing Sheet

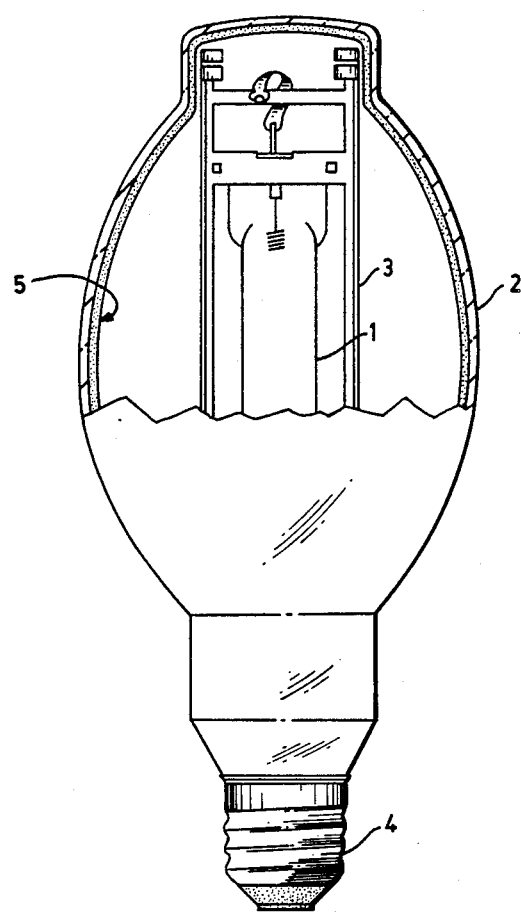

LAMP ENVELOPE HAVING A LUMINESCENT MATERIAL ON THE INTERIOR SURFACE THEREOF, METHOD OF APPLYING SAID MATERIAL, AND MATERIAL TO BE APPLIED

This is a continuation of co-pending application Ser. No. 655,115 filed on Sept. 27, 1984, now abandoned which is a division of 472,399 filed Mar. 4, 1984.

TECHNICAL FIELD

This invention relates to luminescent materials, lamp bulbs coated with such materials and to methods for applying the luminescent materials to the bulbs. It has particular application to high intensity discharge (HID) lamps.

BACKGROUND ART

HID lamps employed arc tubes sealed in outer jackets frequently utilize a coating of a luminescent material on the interior surface of the jacket for light enhancement and/or color correction and/or to produce light having a particular color temperature.

It is occassionally necessary, to produce light having a warm color temperature, say 3000° K. to 3300° K., to employ a relatively heavy layer of a luminescent material. By relatively heavy is meant a material weight greater than 0.007 grams per square centimeter (g/cm$^2$). Generally, luminescent materials for such lamps are applied by an electrostatic deposition process, exemplified by U.S. Pat. No. 3,999,508. Adhesion problems occur, however, when material weights greater than 0.007 g/cm$^2$ are required.

DISCLOSURE OF THE INVENTION

It is therefore, an object of the invention to obviate the disadvantages of the prior art.

It is another object of the invention to improve adhesion of relatively heavy amounts of luminescent materials.

Yet another object of the invention is the provision of a process for applying relatively heavy amounts of luminescent material.

Still another object of the invention is the provision of a new composition of matter.

These objects are accomplished, in one aspect of the invention, by the provision of a composition of matter which comprises a luminescent material and boric acid.

The composition of matter is electrostatically applied to a substrate, e.g., the interior surface of a lamp envelope. The envelope is then heated to a temperature high enough to convert the boric acid to boron anhydride and the envelope is subsequently cooled. The employment of this composition of matter and this process allows coating weights greater than 0.007 g/cm$^2$.

BRIEF DESCRIPTION OF THE DRAWING

The single FIGURE illustrates a lamp, partially in section, utilizing the invention.

BEST MODE FOR CARRYING OUT THE INVENTION

For a better understanding of the present invention, together with other and further objects, advantages and capabilities thereof, reference is made to the following disclosure and appended claims taken in conjunction with the above-described drawing.

Referring now to the drawing with greater particularity, the high intensity discharge lamp shown comprises a mercury-containing arc tube 1 within a glass outer jacket 2. Arc tube 1 contains an inert starting gas and can also contain one or more metal halides. The arc tube is supported in arc tube mount 3 and has the usual electrical connections to a base 4. The inner wall of jacket 2 has a coating 5 adhered thereto. Coating 5 as applied is a composition of matter comprising a luminescent material and boric acid. The coating is granular and is applied by electrostatic deposition.

The boric acid ($H_3BO_3$ X $H_2O$) can comprise up to about 20 weight percent of the composition and preferably comprises about 5% by weight.

In a specific example, a luminescent material comprised of about 50 weight percent of manganese activated magnesium fluorogermanate and about 50 weight percent europium activated yttrium orthovanadate was substantially homogeneously blended with 5 weight percent boric acid.

This composition is electrostatically applied to the interior of a lamp envelope in an amount equal to about 0.0087 to 0.010 grams per square centimeter (g/cm$^2$). This amounts to a total weight of about 2.3 to 2.8 grams for a BT37 envelope.

The envelope, and its deposited composition, is then heated to a temperature high enough to connect the boric acid to boron anhydride; e.g., at least 300° C.; and then subsequently cooled, providing an envelope having a relatively heavy, well adhered coating.

It is believed that during the heating step, the boric acid begins to give up its water of hydration at about 175° C. With continued heating a soft borate type glass is formed which wets the luminescent material particles and the inner surface of the envelope. Additional heating completes the conversion to $B_2O_3$, boron anhydride. This compound is stable in a lamp and causes no changes in the maintenance characteristics of lamps in which it is employed.

Use of this material and this process allows luminescent material weights in the neighborhood of four or five times as great as those typically employed.

While there have been shown and described what are at present considered to be the preferred embodiments of the invention, it will be apparent to those skilled in the art that various changes and modifications can be made herein without departing from the scope of the invention as defined by the appended claims.

I claim:

1. An envelope for a high intensity discharge lamp, said envelope having a luminescent composition of matter securely secured to its inside surface by boron oxide formed on the envelope surface from boric acid admixed with the luminescent composition of matter, the luminescent composition of matter having a coating weight of 0.0087 to 0.010 g/cm$^2$.

2. The envelope of claim 1 wherein said luminescent composition of matter is substantially evenly distributed on a given area of said envelope.

* * * * *

UNITED STATES PATENT AND TRADEMARK OFFICE
CERTIFICATE OF CORRECTION

PATENT NO. : 4,914,346

DATED : April 3, 1990

INVENTOR(S) : Robert C. Ingraham

It is certified that error appears in the above—identified patent and that said Letters Patent is hereby corrected as shown below:

Col. 1, line 19: "employed" should be --employing--.

Col. 2, line 31: "connect" should be --convert--.

Signed and Sealed this

Sixth Day of August, 1991

*Attest:*

HARRY F. MANBECK, JR.

*Attesting Officer*  *Commissioner of Patents and Trademarks*